United States Patent [19]

Rynaski et al.

[11] Patent Number: 5,440,617
[45] Date of Patent: Aug. 8, 1995

[54] SIMPLE MODEM LOG-ON AUTHENTICATION

[75] Inventors: Richard F. Rynaski, Middlefield; Brian F. Beloin; Craig D. Bogli, both of Avon, all of Conn.

[73] Assignee: Otis Elevator Company, Farmington, Conn.

[21] Appl. No.: 226,207

[22] Filed: Apr. 11, 1994

[51] Int. Cl.⁶ .............................................. H04M 11/00
[52] U.S. Cl. ...................................... 379/95; 379/98; 379/97
[58] Field of Search ................ 379/95, 102, 104, 105, 379/96, 97, 98, 93, 100; 375/8

[56] References Cited

U.S. PATENT DOCUMENTS

| | | | |
|---|---|---|---|
| 4,672,533 | 6/1987 | Noble et al. | 379/95 |
| 4,763,351 | 8/1988 | Lipscher et al. | 379/95 |
| 4,905,281 | 2/1990 | Surjaatmadja et al. | 379/95 |
| 5,131,025 | 7/1992 | Hamasaki | 379/95 |
| 5,198,806 | 3/1993 | Lord | 379/102 |
| 5,333,152 | 7/1994 | Wilber | 379/102 |

*Primary Examiner*—Wing F. Chan
*Assistant Examiner*—Stella L. Woo

[57] ABSTRACT

After receiving an answer tone from a receiver modem, a sender modem transmits a series of DTMF pulses of predetermined tone, duration, and spacing. If the receiver modem does not verify that the pulses have the correct tone, duration and spacing, it simply hangs up.

27 Claims, 4 Drawing Sheets

SIMPLE MODEM LOG-ON AUTHENTICATION

TECHNICAL FIELD

This invention relates to a simple system of authenticating log-on between a pair of modems.

BACKGROUND ART

It has become common to monitor machinery and apparatus of various sorts remotely from the location of such apparatus utilizing automated sensing and measuring equipment, computerized analysis, and automated transmissions of alarms and data via modem to central locations where response can be initiated. An example is in a city in which a plurality of buildings having multiple elevators each may transmit information concerning degradation or failure of an elevator to a single location in a city, where response may or may not be initiated, and additionally sending such information from a number of cities to a single central location for further response.

The use of modems on ordinary telephone lines is, however, subject to receipt of spurious, unauthorized messages, as a result of intentional mischief, and as a result of misdialed or misdirected phone calls. Some realistic consequences of spurious messages include corruption of data bases, including erasure of stored data, such as maintenance data, unwarranted access to control over building equipment, such as lights, heating and ventilating and the like.

An obvious, similar situation exists with respect to fax machines, which are more and more subject to auto dialing, advertising, and other unwanted input. In cases where a fax machine is desired to be utilized only in a priority fashion with more than just a few, predetermined senders (which could be controlled by polling numbers), a need exists to preclude responding to unwanted calls.

DISCLOSURE OF INVENTION

Objects of the invention include provision of a simple authentication process for modem sign-on.

According to the invention, before a modem will respond to a message transmitted thereto over phone lines, it authenticates the identity of an authorized sender modem through an authentication process which utilizes dual tone, multiple frequency (DTMF) pulses. According further to the invention, the pulses must have the correct DTMF tones. In still further accord with the invention, a plurality of pulses must each have correct unique DTMF tones. According to the invention still further, the tones must be of a correct duration. In accordance with the invention further still, each of the tones must be of a correct unique duration. In accordance with the invention, the tones must each be separated by a space of a correct duration. According still further to the invention, each tone must be separated from adjacent tones by spaces having correct, unique durations.

Other objects, features and advantages of the present invention will become more apparent in the light of the following detailed description of exemplary embodiments thereof, as illustrated in the accompanying drawing.

BEST MODE FOR CARRYING OUT THE INVENTION

The embodiment herein assumes that there is a sender modem which will place a call to a receiver modem; the receiver modem will reply to the sender modem in the usual fashion to indicate that it can receive a message. However, in accordance with the present invention, the sender will not begin to transmit the message until the sender has sent a code to the receiver which the receiver verifies as a correct code. In this embodiment, ordinary dual tone multiple frequency (DTMF) encoders and decoders are used; in the preferred embodiment, the encoders and decoders used specifically for the invention would preferably have frequency combinations which are different than those used for any of the numbers 0–9 in common use for dual tone, multi-frequency (DTMF) dialing. However, the invention may well be practiced with an adequate degree of security, if desired, utilizing the standard DTMF tone combinations for numbers 0–9. It is assumed that the modems used in practicing the invention are associated with digital processing apparatus, as is typical. It is immaterial whether the digital processing apparatus disclosed herein is part of a modem, part of an answering machine, or part of some other function performing apparatus. The invention may be used with remote diagnostics, or with any other form of apparatus in which messages sent from one modem to another should be ignored unless the sending modem is authorized to cause a response in the apparatus associated with the receiving modem. Thus, the formulation of and nature of the message, and the use to which it may be put in apparatus associated with a receiving modem, are not disclosed in detail herein and are not relevant to the use of the invention. Various messages may be sent for various purposes, and responded to when the authorization of the sender is verified according to the invention.

Figure 1:
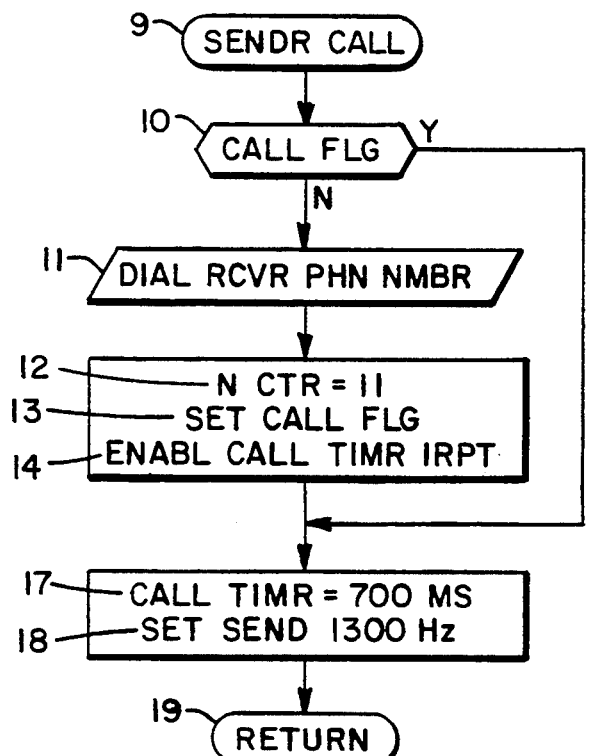
FIG. 1 is a logic flow diagram of a sender call routine in accordance with the present invention.

Referring to FIG. 1, a sender call routine is reached through an entry point 9 and a first step 10 determines if a call flag (described hereinafter) has been set, or not. Initially it will not have been set, so a negative result of the test 10 reaches a subroutine 11 which causes the desired receiver phone number to be dialed, in the normal fashion. Then a step 12 sets an N counter (a counter used to keep track of iterations in the embodiment herein) equal to 11, which is the number of times that the sender will send a call identification signal and then wait for a response. This is part of the normal, modem initiation process. Then a step 13 sets the call flag to indicate that the call has already been dialed in the subroutine 11, and a step 14 enables a call timer interrupt, the purpose of which is described hereinafter with respect to FIG. 2. A step 17 sets a call timer to 700 milliseconds, and a step 18 sets a flag to indicate that the modem should send a 1300 Hertz call identification signal to the receiver. Then other parts of the program are reverted to through a return point 19.

During the next 700 milliseconds, the sender provides the 1300 Hertz call identification signal on the telephone lines. When 700 milliseconds has expired, the call timer times out and causes a call timer interrupt.

Figure 2:
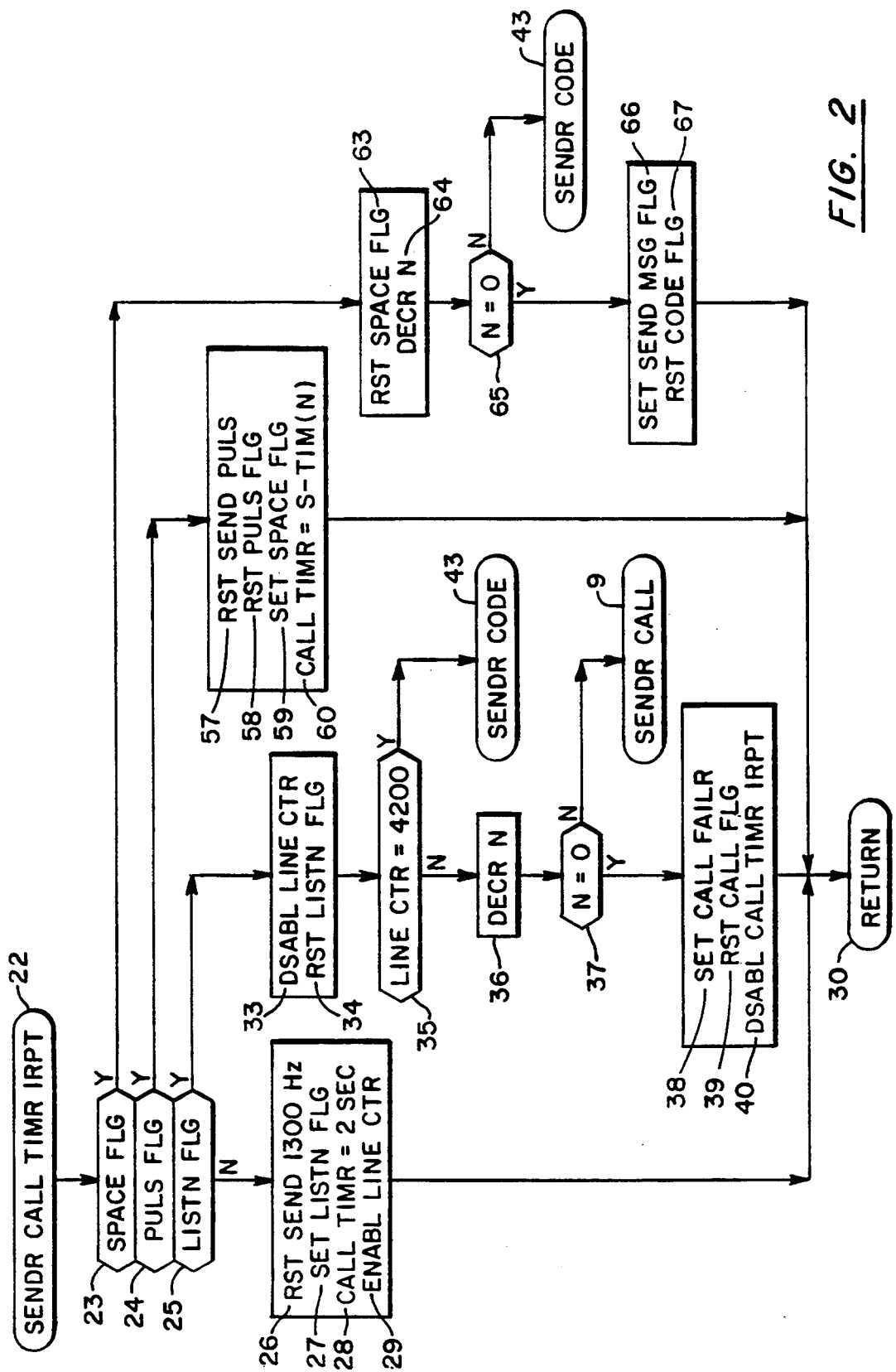
FIG. 2 is a logic flow diagram of a sender call timer interrupt routine in accordance with the present invention.

In FIG. 2, the call time interrupt routine is reached through an entry point 22, each time that the call timer times out. A plurality of tests 23–25 determine if a space flag, a pulse flag, or a listen flag have been set, or not. These flags are described hereinafter. Initially, the flags will not be set so a negative result of each of the tests 23–25 reach a step 26 which resets the send 1300 Hertz flag, causing the end of the call identification signal transmission on the telephone lines; and a step 27 which sets the listen flag, indicating that the sender is now going to listen for a carrier detection signal response from the receiver. Then a step 28 sets the call timer to two seconds, and a step 29 enables a line counter, which is used to count transitions on the telephone line to determine if the receiver is sending a 2100 Hertz carrier detection signal back to the sender to indicate that the receiver is capable of receiving a message. This is the normal handshake between modems, as is well known in the art. Then, other parts of the program are reverted to through a return point 30.

After two seconds have elapsed, the call timer will again time out and reach the call timer interrupt routine through the entry point 22. This time, negative results of tests 23 and 24 and a positive result of test 25 (the listen flag was set in step 27) will reach a step 33 where the line counter is disabled; this causes the count of voltage swings on the line during the last two seconds to be present in the line counter. Then a step 34 resets the listen flag so as to advance the state of the software. A test 35 determines if the line counter has a count of 4200, indicating 2100 Hertz over two seconds. This test need not be absolute, but may preferably subtract 4200 from the line counter and determine if the absolute value of the result is within some threshold tolerance, such as 20 or 40 counts. If the line counter has not been advanced closely enough to 4200, then the count is ignored; this might be because the receiver has transmitted nothing, or the receiver has started transmitting 2100 Hertz signal somewhere midway in the two second period which has just expired. If the count is not 4200, a negative result of test 35 reaches a step 36 where the N counter is decremented and then a test 37 determines if the N counter has been decremented to zero or not. Initially, it will not, so a negative result of test 37 reaches the sender call transfer point 9, causing the program to revert to FIG. 1.

In FIG. 1, test 10 will not be affirmative since the call flag was set in step 13 in a prior pass through the routine of FIG. 1. This bypasses dialing of the receiver phone number, presetting the N counter and enabling the call timer interrupt; but step 17 again sets the call timer to 700 milliseconds and step 18 causes the 1300 Hertz call identification signal to be sent. Then other parts of the program are reverted to through the return point 19. After 700 milliseconds, the call timer will time out and reach the program of FIG. 2 through the entry point 22. Since the listen flag was reset in the step 34 in the prior pass through FIG. 2, all three tests 23–25 will be negative reaching the steps 26–29 which ends the sending of the 1300 Hertz call identification signal, sets the listen flag, sets the call timer to two seconds, and enables the line counter so that it can respond to a 2100 Hertz signal sent by the receiver (if any). And then, other parts of the program are reverted to through the return point 30.

After two seconds, the call timer will again time out reaching the tests 23 and 24 which are still negative, and the test 25 which is still positive. Steps 33 and 34 disable the line counter and reset the listen flag, as before. Then test 35 determines if the line counter has counted to about 4200, indicating that it has received the correct carrier detection response from the receiver. If it does not do so, after 11 passes through the routine of FIG. 2, the decrementing in step 36 will eventually cause test 37 to be affirmative, which will reach a step 38 to set a call failure flag to indicate that the call has not been acknowledged, a step 39 which resets the call flag (set in step 13 of FIG. 1), and a step 40 which disables the call timer interrupt, to prevent unwanted initiation of the routine of FIG. 2.

Assume that the receiver has sent the 2100 Hertz carrier detection signal for a full two second period. This will cause an affirmative result of test 35 to reach a sender code routine of FIG. 3 through a transfer point 43.

Figure 3:
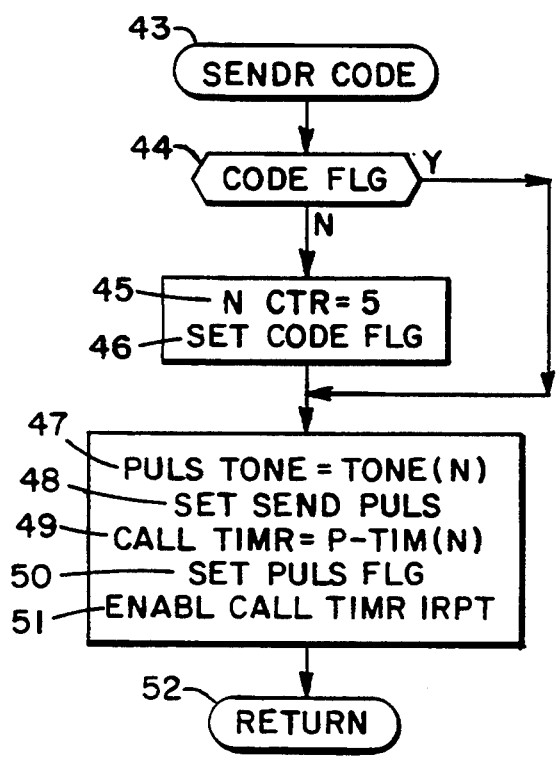
FIG. 3 is a logic flow diagram of a sender code routine in accordance with the present invention.

In FIG. 3, a first step 44 determines if a code flag (described hereinafter) has been set or not. Initially it will not, so a negative result of test 44 reaches a step 45 to set the N counter to five, and a step 46 which sets the code flag. The code flag will cause these two steps 45, 46 to be bypassed in subsequent passes through the routine of FIG. 3, because of the test 44. Then, a step 47 causes the pulse tone to be selected as the tone for word N and a step 48 causes a pulse of that tone to be sent over the phone line to the receiver. A step 49 sets the call timer to the pulse time indicated for word N, a step 50 sets the pulse flag (used in FIG. 2) and a step 51 enables a call timer interrupt. Then other parts of the program are reverted to through a return point 52.

The duration of each pulse and the space between it and the next pulse are part of the authentication process herein. The pulses may be of a duration on the order of 70 to 1,000 milliseconds, but may typically be about 200–300 milliseconds. The spaces may have similar durations, but may be typically on the order of 700–800 milliseconds. These details depend on other characteristics of apparatus in which the invention is to be implemented, such as its basic computer cycle time, and the like. It is anticipated that each pulse will have a duration different than any of the other pulses, and that each space may have a duration different than any other space; however, this is not required, and in fact, any workable pulse duration and pulse space can be used, if desired.

When the duration of the pulse initiated in step 48 has expired, the call timer will time out and cause the sender call timer interrupt routine of FIG. 2 to be reached through the entry point 22. Initially, test 23 is negative but test 24 is positive (set in step 50) so an affirmative result will reach a step 57 which resets the send pulse indicator, causing the end of the pulse. In this fashion, the pulse having the tone for pulse N has the duration for pulse N. Then the pulse flag is reset in a step 58 and a space flag is set in a step 59, which will cause the routine of FIG. 2 to advance to the next state in a subsequent pass therethrough. And, the call timer is set equal to the space time for pulse N a step 63.

When the time for the between-pulse space has elapsed, the sender call timer will time out, and the interrupt will be reached through the entry point 22. This time, test 23 is affirmative reaching step 63 which resets the space flag, and the N counter is decremented in a step 64. Then a test 65 determines if N has been reduced to zero or not. Initially it will not so a negative result of test 65 reaches the routine of FIG. 3 through the transfer point 43, to send the second pulse in the sequence (which will be designated as N=4) due to the decrementing of step 64 in FIG. 2.

Since the code flag has previously been set, steps 45 and 46 are bypassed, reaching steps 47-51 where the tone for the second word is selected and a pulse of that tone is caused to be sent, the timer is set to the pulse time for the second word, the pulse flag is set, and the call timer interrupt is enabled. Then other parts of the program are reached through the return point 52.

When the pulse time for the second pulse expires, the call timer will time out causing the routine of FIG. 2 to again be reached through the entry point 22. Initially, test 23 is negative and test 24 is positive, reaching the steps 57-60 for the second pulse, causing the end of transmission of the second pulse, resetting the pulse flag, setting the space flag and setting the call timer to the value for the space time for the space following the second pulse: and other programming is reached through the return point 30. When the space time has elapsed for the second pulse, the call timer times out, causing an interrupt through the entry point 22 of FIG. 2, and test 23 is affirmative. The space flag is reset and the N counter is decremented in steps 63 and 64, and the value of N is examined in test 65. Until five pulses have been sensed, test 65 will be negative causing the routines of FIGS. 2 and 3 to be repeated as before. Eventually, when all five pulses have been sent, an affirmative result of test 65 will reach a step 66 which sets a send message flag, indicating to the sender apparatus that a message can be sent by the modem over the phone lines, and a step 67 will reset the code flag (of step 46, FIG. 3) to ready the logic for a subsequent message operation. In the embodiment described, the space for each of the pulses is the space between it and the immediately preceding pulse; for the first pulse, that space is zero. For the last pulse, the space is that between the fourth and fifth pulses.

Figure 4:
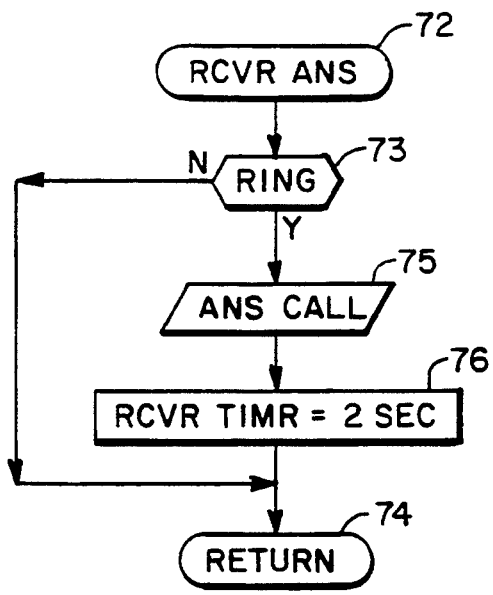
FIG. 4 is a logic flow diagram of a receiver answer routine in accordance with the present invention.

Referring now to FIG. 4, a receiver answer operation is illustrated as if it were a routine reached through programming. If it were, an entry point 72 would cause the routine to reach a test 73 to determine if there is a ring condition (high voltage) on the line or not. If not, other parts of the program will be reached through a return point 74. But if there were a ring, then an affirmative result of test 73 would reach a routine 75 to answer the call. In fact, the test and routine 73 and 75 are implemented by the module itself rather than being controlled by software. However, whenever the call is answered, that is, the receiver modem initially reaches an off hook condition, a step 76 will set a receiver timer to two seconds, and other programming is reverted to through the return point 74.

Figure 5:
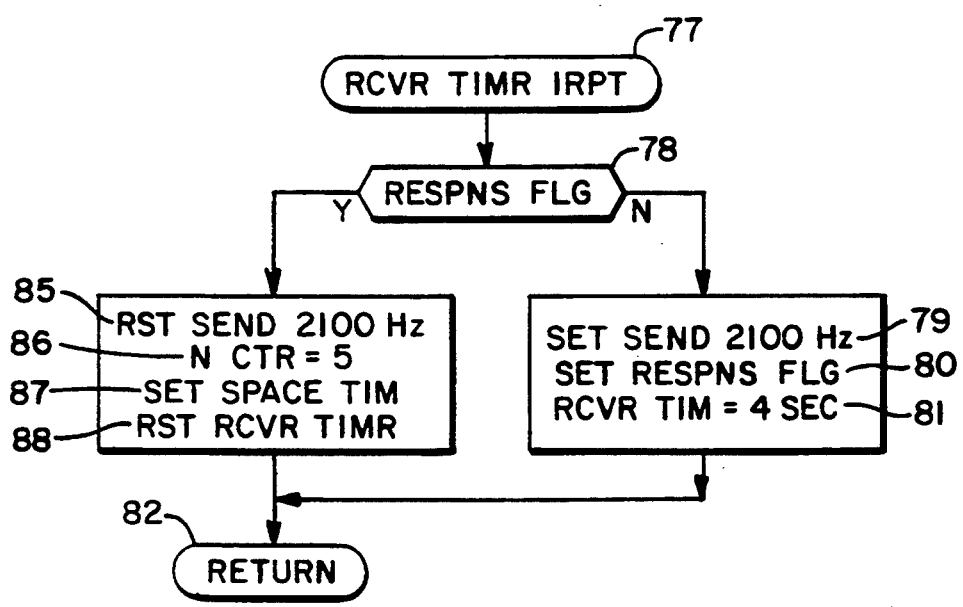
FIG. 5 is a logic flow diagram of a receiver timer interrupt routine in accordance with the present invention.

When the receiver timer times out, it will cause a receiver timer interrupt which is reached through an entry point 77 in FIG. 5. A first test 78 determines if a response flag has been set or not. Initially, it will not have been set so a negative result of test 78 reaches a step 79 to cause the receiver modem to send a 2100 Hertz carrier detection signal back to the sender over the telephone line. And, the response flag is set in the step 80 and the receiver timer is set to four seconds (to time the 2100 Hertz signal) in a step 81. Then other parts of the program are reverted to through a return point 82. When the receiver timer times out (after four seconds), it will again cause an interrupt reaching the test 78, which now is affirmative thereby reaching a step 85 which causes the 2100 Hertz carrier detection signal to terminate. An N counter (in the receiver unit) is set equal to five (indicative of the five tone pulses which should be sent to it) in a step 86. A space time flag is set in a step 87, indicating that a first DTMF decode interrupt (referred to in FIG. 6 hereinafter) will occur during a space time (rather than during the time of a pulse). And a step 88 resets the receiver timer (a housekeeping step to ensure that the timer can be used as an elapsed time counter in FIG. 6, if necessary; this step can be eliminated if not needed). And, other parts of the program are reached through the return point 82.

When the receiver stops sending the 2100 Hertz carrier identification detection signal, it immediately begins looking for the first one of the five tone pulses used in the invention for authentication. This is achieved in FIG. 6 by means of a receiver DTMF decode interrupt routine which is reached through an entry point 93. This interrupt can be caused by one of the outputs of the DTMF decode which provides a signal whenever a DTMF signal is decoded regardless of which particular number, 0-9 or other character, it has decoded from the DTMF input. Thus, whenever the DTMF decode does sense a valid input and provides a selected output signal indicative thereof, the interrupt routine of FIG. 6 will be reached through the entry point 93. A first test 94 determines if this interrupt was caused during space time and therefore causing the end of space time. The first interrupt will be at the end of space time since it will be caused by the beginning of the first pulse received by the receiver modem. Thus, an affirmative result of test 94 reaches a step 95 in which space time is set equal to the receiver timer, to preserve it for comparison as described hereinafter, and then the receiver timer is immediately reinitiated in a step 96 so it can time the duration of the first pulse. Then a step 97 resets the space time flag thereby indicating a pulse is in process. Because the receiver timer was reset in the step 88 of FIG. 5, it will be zero during the first pass through the interrupt routine of FIG. 6. The space time for the first pulse to be transmitted (N=5) is set to zero so that comparison in a test 98 with the space time saved from the receiver timer for the first pulse will always be successful. An affirmative result of test 98 reaches a test 99 to see if the decoded tone output from the DTMF decoder equals the tone for the pulse designated by N (in this case the first pulse). If the tone of the first pulse is not the tone that it is supposed to be, a negative result of test 99 reaches a step 100 which causes the receiver modem to hang up (go on hook), and then other parts of the program are reached through a return point 101. On the other hand, if a decoded tone is the correct one for the first pulse, an affirmative result of test 99 causes other parts of the program to be reverted to. Stated alternatively, success is simply not causing the receiver modem to hang up.

Figure 6:
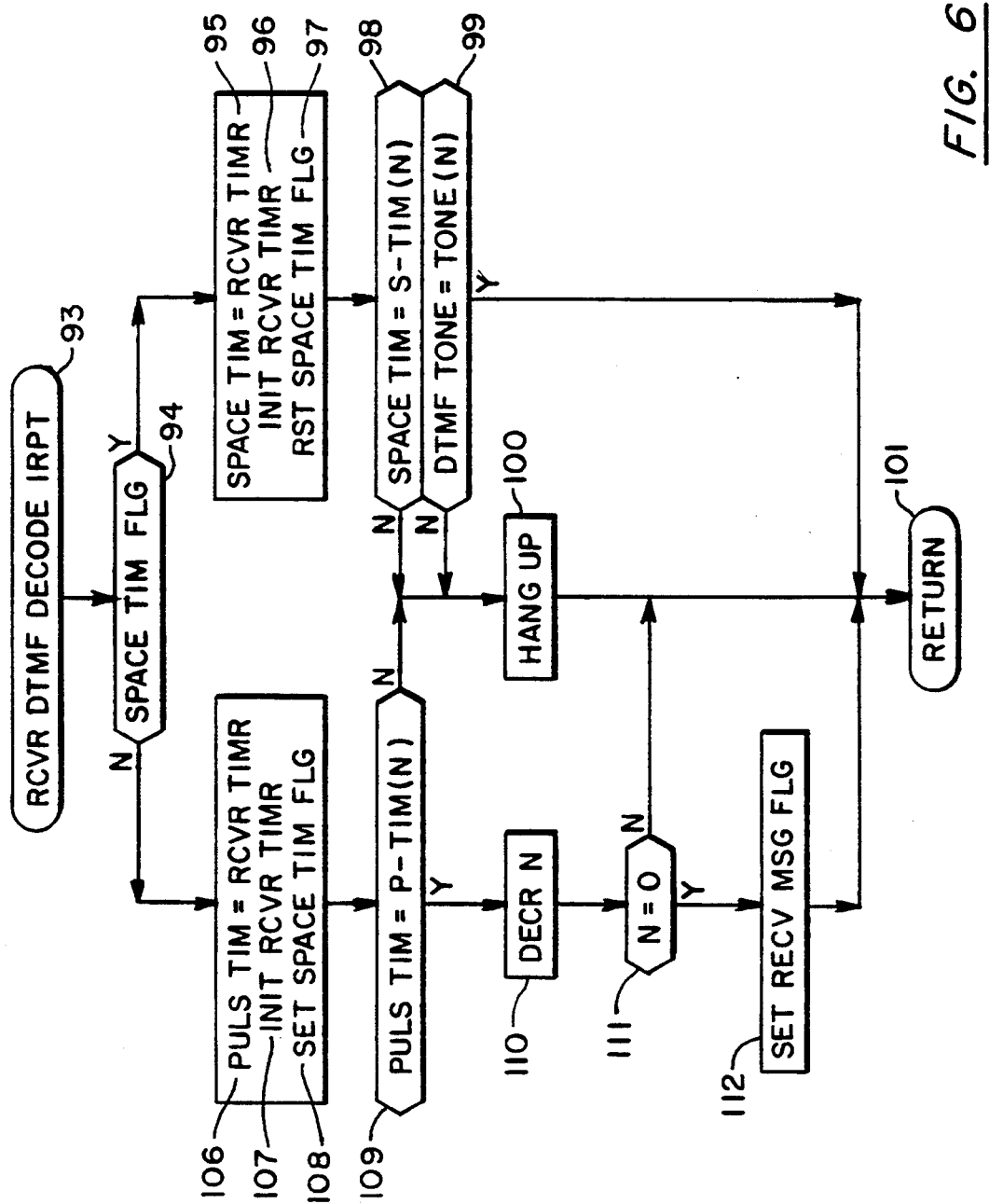
FIG. 6 is a logic flow diagram of a receiver DTMF decode interrupt routine in accordance with the present invention.

In the present embodiment, it is assumed that the receiver DTMF decode interrupt, which reaches the entry point 93 of FIG. 6, can be caused either by the beginning of an output signal from the DTMF decode circuit module, as well as by the end of an output signal from the DTMF decode module. Therefore, when the first pulse ends, another receiver DTMF decode interrupt will occur, reaching the test 94, which this time will be negative (because of resetting in step 97) thereby reaching a step 106 which sets the pulse time equal to the current setting of the receiver timer and then the receiver timer is immediately reinitiated in a step 107 so as to time the following space. And then a step 108 sets the space time flag again, indicating that the next interrupt will be indicative of the end of a space. Then a test 109 determines if the pulse duration (recorded at step 106) is the correct duration for a pulse designated by N (in this case the first pulse). If not, a negative result of test 109 reaches the step 100 to cause the receiver modem to hang up, and then other programming is reached through the return point 101. In a normal case, test 109 will be affirmative reaching a step 110, where the N counter is decremented, and a test 111, where it is determined whether all of the pulses have been received and examined or not. If not, a negative result of test 111 causes other programming to be reverted to through the return point 101, and the routine of FIG. 6 will wait for the next DTMF decode interrupt. If five pulses (in this embodiment) have been received, examined, and found to be of the correct tone, the correct duration, and separated by spaces of the correct duration, an affirmative result of test 111 may reach a step 112 to set a receive message flag (if desired). In any event, an affirmative result of test 111, without having the step 100 cause the receiver modem to hang up, is success, leaving the receiver in condition to receive the message from the sender modem. But, if any pulse has the wrong tone, is of the wrong duration, or follows the preceding pulse by a space of the wrong duration, the step 100 will be reached causing the unit to hang up and thereby not be responsive in any way to the message which will be sent by the sender modem (which always occurs since step 66 of FIG. 2 is always reached in the sender).

The foregoing description is exemplary of one embodiment only of the present invention. Naturally, a number of pulses other than five may be used if desired. The detailed manner of accomplishing the creation of pulses of proper duration spaced properly, and recognizing those pulses may be achieved in a variety of ways other than the way disclosed herein.

The functions may be performed entirely by hardware, or with a different hardware/software mix, if desired.

The space time and pulse time comparisons need not be absolute, but may be based on the predetermined time being within a threshold magnitude of the measured time.

The DTMF tones may be sent by the dialing DTMF encoder or by a different DTMF encoder not used for dialing.

The characteristics of the pulses which are to be compared with the predetermined corresponding characteristics associated with the receiver modem may be set up in both the sender and the receiver in an electrically programmable read only memory, or they may be established in registers which may be accessed and therefore changed by means of keyboard entry, or they may be established by manual controls, such as switches. All of this is irrelevant to the present invention.

It should be noted that the receiver modem hangs up essentially instantly upon detection of a difference in one of the characteristics of the pulses. The rapidity of hanging up is of course related to the desire to not have the modem respond in any fashion to the digital message which follows the coded pulses. If desired, an embodiment of the invention may hang up at a more remote time but, equivalently, become unresponsive to any digital message which follows the sensing of a difference in one of the pulse characteristics. Thus, as used herein, the term "hang up" and the term "disconnecting ... from the telephone lines" mean rendering the receiving modem non-responsive to a digital message which follows sensing of a difference between one of the predetermined characteristics and the corresponding characteristic of one of the pulses (tone frequencies, duration, duration between it and another pulse). Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A system for authenticating sign-on between a pair of modems operating over common carrier telephone lines, comprising:

a sender modem having means including a dual tone, multiple frequency encoder, for sending a receiver modem phone number, a call identification signal, and pulses over the telephone lines, means for receiving over the telephone lines a carrier detection signal from a receiver modem, and means for sending digital messages over the telephone lines;

a sender signal processor for causing said sender modem, in response to presence of a digital message to be sent to a receiver modem, to send the phone number of the receiver modem over the telephone lines, and for causing said sender modem, in response solely to receipt of said carrier detection signal by said sender modem, to first automatically send, without prompting by the other one of said modems, a plurality of pulses having unique characteristics and to immediately thereafter automatically send, in every case, a digital message destined for the receiver modem;

a receiver modem including means for answering a call directed thereto over the telephone lines, means for sending a carrier detection signal over the telephone lines, and means for receiving and decoding dual tone, multi-frequency pulses received thereat over the telephone lines; and a receiver signal processor for causing, in response solely to said receiver modem initiating an off-hook condition and answering an incoming call, said receiver modem to send a carrier detection signal over said telephone lines, for providing predetermined characteristics of pulses to be received thereat to authenticate sign-on with any sender modem, for automatically comparing, without prompting by said sender modem, said predetermined characteristics with corresponding characteristics of any pulses received by said receiver modem after said receiver modem sends said carrier detection signal, and for causing said receiver modem to hang up in response to differences between one of said predetermined characteristics and a corresponding characteristic of one of said received pulses.

2. A system according to claim 1 wherein said receiver signal processor causes said receiver modem to hang up in response to one of said predetermined characteristics differing from the corresponding received pulse characteristic by more than a threshold magnitude.

3. A system according to claim 1 wherein one of said predetermined characteristics is a pair of dual tone frequencies of one of said pulses.

4. A system according to claim 3 wherein said pair of dual tone frequencies is a pair of standard dual tone, multi-frequency dialing tone frequencies.

5. A system according to claim 4 wherein said pulses are generated by said dual tone, multi-frequency encoder.

6. A system according to claim 3 wherein said pair of frequencies is other than a standard pair of dual tone, multi-frequency dialing tone frequencies.

7. A system according to claim 3 wherein another one of said predetermined characteristics is a second pair of dual tone frequencies of another one of said pulses.

8. A system according to claim 7 wherein said pairs of dual tone frequencies are different from each other.

9. A system according to claim 1 wherein one of said predetermined characteristics is the duration of said one pulse.

10. A system according to claim 9 wherein another one of said predetermined characteristics is the duration of a second one of said pulses.

11. A system according to claim 10 wherein said durations are mutually different.

12. A system according to claim 1 wherein one of said characteristics is the duration of a space between a pair of pulses including said one pulse and another one of said pulses.

13. A system according to claim 12 wherein another one of said characteristics is the duration between one of said pair of pulses and a third one of said pulses.

14. A system according to claim 13 wherein said two durations are mutually different.

15. A method for authenticating sign-on between a pair of modems connected to common carrier telephone lines, comprising:
sending, from a receiver modem, a carrier detection signal over the telephone lines in response to said receiver modem answering a call;
sensing, at a sender modem, a carrier detection signal on the telephone lines and solely in response thereto, sending a plurality of pulses immediately followed by a digital message from said sender modem over the telephone lines;
comparing characteristics of pulses received at said receiver modem after it sends said carrier detection signal, with predetermined corresponding characteristics of pulses which would be effective to authenticate sign-on with a sender modem; and
disconnecting said receiver modem from the telephone lines in response to a difference between one of said predetermined characteristics and a corresponding characteristic of one of said pulses, whereby said receiver modem will not receive said digital message.

16. A method according to claim 15 wherein said step of disconnecting comprises disconnecting said receiver modem from the telephone lines in response to one of said predetermined characteristics differing from the corresponding received pulse characteristics by more than a threshold magnitude.

17. A method according to claim 15 wherein one of said predetermined characteristics is a pair of dual tone frequencies of one of said pulses.

18. A method according to claim 17 wherein said pair of dual tone frequencies is a standard pair of dual tone, multi-frequency dialing tone frequencies.

19. A method according to claim 17 wherein said pair of frequencies is other than a standard pair of dual tone multi-frequency dialing tone frequencies.

20. A method according to claim 17 wherein another one of said predetermined characteristics is a second pair of dual tone frequencies of another one of said pulses.

21. A method according to claim 20 wherein said pairs of dual tone frequencies are different from each other.

22. A method according to claim 21 wherein said durations are mutually different.

23. A method according to claim 22 wherein said two durations are mutually different.

24. A method according to claim 20 wherein another one of said predetermined characteristics is the duration of a second one of said pulses.

25. A method according to claim 24 wherein another one of said characteristics is the duration between one of said pair of pulses and a third one of said pulses.

26. A method according to claim 15 wherein one of said predetermined characteristics is the duration of said one pulse.

27. A method according to claim 15 wherein one of said characteristics is the duration of a space between a pair of pulses including said one pulse and another one of said pulses.

* * * * *